United States Patent Office 3,439,095
Patented Apr. 15, 1969

3,439,095
INCREASING EGG PRODUCTION IN POULTRY BY ADMINISTERING POULTRY FEEDING THIAMINE DERIVATIVES AND POULTRY FEED COMPOSITIONS CONTAINING SAID DERIVATIVES
Yoshio Hamada, Tokyo, and Motohisa Yoshino, Osaka, Japan, assignors to Takeda Chemical Industries, Ltd., Osaka, Japan
No Drawing. Filed Dec. 28, 1965, Ser. No. 517,115
Claims priority, application Japan, Dec. 29, 1964, 39/74,887
Int. Cl. A61k 27/00; A23k 1/16
U.S. Cl. 424—255                                      6 Claims

ABSTRACT OF THE DISCLOSURE

A method for elevating the rate of egg production, fertility and hatchability of poultry comprises the feeding of the poultry with a compound of the formula $$\begin{array}{c} N=C-NH_2 \\ | \quad | \\ CH_3-C \quad C-CH_2-N \\ \| \quad \| \\ N-CH \end{array} \begin{array}{c} CHO \\ / \\ \diagdown \\ C=C \\ | \quad \diagdown \\ CH_3 \quad CH_2CH_2OH \end{array} S-S-CH_2R$$

wherein R is a member selected from the group consisting of alkyl having up to 6 carbon atoms, tetrahydrofuryl and tetrahydropyranyl, in feedstuff, the amount of compound being 5 to 100 milligrams per kilogram of a feedstuff.

---

This invention relates to an improvement in poultry feeding.

More particularly, this invention relates to a method for elevating the rate of egg production, fertility and hatchability of poultry, which comprises feeding poultry a certain amount of a compound of the formula $$\begin{array}{c} N=C-NH_2 \\ | \quad | \\ CH_3-C \quad C-CH_2-N \\ \| \quad \| \\ N-CH \end{array} \begin{array}{c} CHO \\ / \\ \diagdown \\ C=C \\ | \quad \diagdown \\ CH_3 \quad CH_2CH_2OH \end{array} S-S-CH_2R$$

wherein R is lower alkyl having up to 6 carbon atoms, tetrahydrofuryl or tetrahydropyranyl, along with conventional feedstuff.

It is known that vitamin $B_1$ is an essential factor for keping poultry healthy and that deficiency thereof in feedstuff results in so-called vitamin $B_1$ dystrophy such as leg paralysis, cramp and even in death of the poultry.

It has also been confirmed that poultry is kept healthy when fed a feedstuff containing about 2 milligrams of vitamin $B_1$ (usually as thiamine chloride hydrochloride) per kilogram of the feedstuff (cf. Poultry Nutrition, 5th Edition Revised. W. Ray Ewing (1963); National Research Council). Conventional feedstuff for poultry therefore contains, or is compounded to contain, 2 milligrams or a little more of vitamin $B_1$ per kilogram of the feedstuff.

Nevertheless, a poultry raiser who intends to provide eggs or to propagate poultry often periodically encounters decreasing rate of egg production, especially in midsummer, in cold winter, during the molting term or when the birds become older than one year and a half. In such periods as above the fertility decreases, and even when fertilized eggs are used for the propagation, hatchability is reduced. Therefore, it has been a long-cherished desire in the art of poultry raising to solve the problem of how to avoid the periodical decreases in the rate of egg production, in fertility and in hatchability.

At first, and for the first time as far as we are aware, we thought that the unfavorable decreases might be avoided by supplying poultry with an excess amount of vitamin $B_1$. However, no improvement in rate of egg production, in fertility and in hatchability was observed when feedstuff was enriched with a relatively high amount of vitamin $B_1$, even with such an unusually high concentration of vitamin $B_1$ as 20 milligrams per kilogram of feedstuff.

On the other hand, the problem is solved according to this invention by supplying poultry with feedstuff enriched with a compound represented by the general Formula I, hereinafter referred to soley as Compounds I. The rate of egg production, fertility and hatchability are clearly improved when a certain large amount of Compounds (I) is administered to poultry, and the effect is especially outstanding in such periods as mentioned above, i.e., midsummer, in cold winter, in the molting term or when the birds become older than one year and a half.

The object of this invention is therefore to provide a method for improving the rate of egg production, fertility and hatchability of poultry.

Another object is to provide a feedstuff for poultry by which decreases in rate of egg production, in fertility and in hatchability are avoided.

Said objects are realized by the expedient of feeding a certain amount of Compounds (I) along with conventional feedstuff.

For the above mentioned objects, Compounds (I) such as thiamine propyl disulfide (TPD), thiamine butyl disulfide (TBD), thiamine heptyl disulfide (THD), thiamine tetrahydrofurfuryl disulfide (TTFD), thiamine tetrahydropyranyl-2-methyl disulfide (TTPD) can be employed. Hereinafter, the respective compounds are referred to by the abbreviated designations shown in the parentheses. The said Compounds (I) are used as free bases or as their acid addition salts, such as hydrochloride, nitrate and sulfate.

The method of this invention, is applicable to any poultry such as hen, layer, breeder, duck, turkey, quail, etc.

The Compounds (I) are conveniently given to the poultry by being admixed with conventional feedstuff. Also the Compounds (I) can be given to the poultry in pellet or mash form or with drinking water. In order to uniformly admixed the Compounds (I) with a conventional feedstuff or drinking water, they can be used as powder, suspension or emulsion.

Generally, the amount of the Compounds (I) to be given to poultry is in the range of about 5 to 100 milligrams, most preferably about 10 to 40 milligrams, per kilogram of a conventional feedstuff. For example, in the case of addition to a feedstuff, it is preferable to adjust the concentration of the Compounds (I) in the feedstuff to about 5 to 100 milligrams per kilogram.

The Compounds (I) can be given to poultry every day or at an interval of several days, for example, one week.

Following are test runs to show the effect of the present invention, and also examples of presently preferred embodiments of the invention. In these test runs and examples, precentages of compositions are all by weight unless othherwise noted. Percentage of egg production is determined as:

Percentage of egg production =

$$\frac{\text{total number of egg(s)}}{\text{number of heads} \times \text{days}} \times 100$$

It is to be understood that modifications and variations may be resorted to without departing from the spirit and scope of the invention, as those skilled in the art will readily understand. Such modifications and variations are considered to be within thhe purview and scope of the invention and appended claims.

TEST 1

Samples: Thiamine hydrochloride (hereinafter referred to as $B_1HCl$), TTFD, TPD.
Test material: White leghorn (breeder).
Number of one group:
female—12 heads a section
male—8 heads a section Composition of basal diet: (Vitamin $B_1$-free feedstuff is designated "basal diet").

|  | Percent |
|---|---|
| Polished rice | 53 |
| Casein | 20 |
| Soybean oil | 5 |
| Cornstarch | 8 |
| Powdered filter paper | 2 |
| Vitamin mixtures [1] | 2 |
| Mineral mixtures [2] | 10 |

[1] Composition of vitamin mixtures in basal diet (per kilogram):

| Vitamin A | 1200 International Units (hereinafter referred to as IU). |
|---|---|
| Vitamin $D_3$ | 3400 IU. |
| Vitamin E | 30 milligrams. |
| Vitamin $B_2$ | 4.2 milligrams |
| Vitamin $B_6$ | 3.5 milligrams. |
| Nicotinic acid | 30.0 milligrams. |
| Pantothenic acid calcium salt | 10.0 milligrams. |
| Biotin | 0.16 milligram. |
| Folic acid | 0.6 milligram. |
| Choline chloride | 1100.0 milligrams. |
| Inositol | 50.0 milligrams. |
| p-Amino benzoic acid | 50.0 milligrams. |
| Vitamin $B_{12}$ | 0.008 milligram. |
| Vitamin $K_3$ | 0.4 milligram. |

[2] Composition of mineral mixtures in basal diet (per kilogram):

|  | Grams |
|---|---|
| NaCl | 5.00 |
| $Ca(PO_4)_2$ | 15.00 |
| $CaCO_3$ | 46.00 |
| $NaH_2PO_4.H_2O$ | 4.6 |
| $K_2HPO_4$ | 16.5 |
| $MgSO_4$ | 13.0 |
| $FeSO_4$ | 0.9 |
| $CuSO_4.5H_2O$ | 0.08 |
| $MnSO_4.4H_2O$ | 0.25 |
| $ZnSO_4.7H_2O$ | 0.27 |
| $CaCl_2.6H_2O$ | 0.01 |
| KI | 0.002 |

Method of test: Test breeders were previously fed with only basal diet for two weeks in order to render uniform the respective breeder's physical condition. Test breeders were fed with test feedstuff (1.5 milligrams of each sample was added per 1 kilogram of feedstuff) for two weeks to observe the rate of egg production, fertility and hatchability.

Result:

(I) The percentage of egg production (percent):

|  | Amount added to 1 kilogram basal diet, mg. | 1st week | 2nd week | Average of two weeks | Percentage of increase relative to that of control |
|---|---|---|---|---|---|
| Control, $B_1HCl$ | 1.5 | 71.5 | 78.7 | 75.1 | 100 |
| TTFD | 1.5 | 81.5 | 81.5 | 81.5 | 108.5 |
| TPD | 1.5 | 82.9 | 81.5 | 82.4 | 109.7 |

(II) Fertility (percent):

|  | Amount added to 1 kilogram basal diet, mg. | 1st week | 2nd week | Average of two weeks | Percentage of increase relative to that of control |
|---|---|---|---|---|---|
| Control, $B_1HCl$ | 1.5 | 69.0 | 56.0 | 62.5 | 100.0 |
| TTFD | 1.5 | 83.0 | 86.0 | 81.5 | 130.7 |
| TPD | 1.5 | 73.5 | (*) | 73.5 | 117.6 |

*The test breeders were killed by a homeless dog, so we can not have this data.

(III) Hatchability (percent):

|  | Amount added to 1 kilogram basal diet, mg. | 1st week | 2nd week | Average of two weeks | Percentage of increase relative to that of control |
|---|---|---|---|---|---|
| Control, $B_1HCl$ | 1.5 | 58.6 | 85.7 | 72.1 | 100.0 |
| TTFD | 1.5 | 84.6 | 100.0 | 92.3 | 128.0 |
| TPD | 1.5 | 86.1 | 96.2 | 81.2 | 112.6 |

Conclusion: TPD and TTFD have excellent effects in elevating the rate of egg production, fertility and hatchability, in comparison with $B_1HCl$ in addition to 1.5 milligrams per kilogram of basal diet. (1.5 milligrams: essential vitamin $B_1$ requirement of breeders.)

TEST 2

Sample: TPD, TTFD.
Test material: Female, New Hampshire (breeder), one year and seven months of age.
Number of one group: 48 heads a section.
Composition of feedstuff:

|  | Percent |
|---|---|
| Corn, yellow | 55 |
| Soybean meal | 12 |
| Bran | 12 |
| Scrap powdered fish meal | 4 |
| Fish solubles | 5 |
| Molasses mixed feed | 3.5 |
| Phosphoric acid | 2.75 |
| Sodium hydrochloride | 0.5 |
| Powdered bones | 1.0 |
| Vitamin A | 0.03 |
| Mineral mixtures | 0.02 |
| Calcium carbonate | 4.2 |
| Vitamin $D_3$ | 0.002 |

(Vitamin $B_1$ content in feedstuff: 4.44 mg./kilogram.)

Method of test: Three test feedstuffs were prepared by supplementing 10 milligrams of TPD, 10 milligrams of TTFD and 20 milligrams of TPD to each 1 kilogram of the feedstuff of the above composition. Hens were fed with each feedstuff. The percentage of egg production was observed from Oct. 2 to the next Mar. 29. The above-mentioned convention feedstuff is continuously employed as the control.

Result:

|  | Amount added to 1 kg. feedstuff, mg. | Nov. | Dec. | Jan. | Feb. | Mar. | Average of five months |
|---|---|---|---|---|---|---|---|
| Control | 0 | 47.3 | 31.5 | 17.0 | 25.0 | 45.9 | 33.0 (100) |
| TPD | 10 | 48.3 | 39.7 | 27.9 | 36.5 | 49.9 | 40.5 (121) |
|  | 20 | 47.2 | 39.8 | 27.3 | 36.2 | 54.3 | 41.0 (123) |
| TTFD | 10 | 45.5 | 38.2 | 27.3 | 36.2 | 53.4 | 40.1 (120) |

Conclusion: The test breeders used in this test were nearly 2 years old and their abilities of egg production were weak. However, Compounds (I) gave good results for recovering their egg production abilities.

TEST 3

Samples: $B_1HCl$, TPD, TTFD.
Test material: A hybrid between New Hampshire and white leghorn, 8 months old.
Number of one group: 13 heads of section.
Composition of feedstuff:

|  | Percent |
|---|---|
| Corn, yellow | 45 |
| Milo [1] | 21 |
| Defatted rice bran | 4 |
| Bran | 4 |
| Soybean cake | 9 |
| Scrap powdered fish meal | 6 |
| Fish solubles | 2 |
| Alfalfa meal | 2 |
| Calcium carbonate | 5 |

[1] Also known as milo-maise.

|   | Percent |
|---|---|
| Phosphoric acid | 0.4 |
| Sodium hydrochloride | 0.35 |
| Furazolidone | 0.1 |
| Vitamin and mineral mixture | 0.15 |

Composition of vitamin and mineral mixture (per kilogram of breeder used).

| Vitamin A | IU | 5000 |
|---|---|---|
| Vitamin $D_3$ | IU | 1000 |
| Vitamin $B_1$ | milligrams | 506 |
| Vitamin $B_2$ | do | 612 |
| Nicotinic acid | do | 500 |
| Pantothenic acid | do | 540 |
| Vitamin $B_6$ | do | 100 |
| Chlorine chloride | do | 955.2 |
| Folic acid | do | 65 |
| Ca | do | 2500 |
| P | do | 611 |
| Mn | do | 10533 |
| Fe | do | 400 |
| Cu | do | 40 |
| Zn | do | 400 |
| Co | do | 6 |

Method of test: Hens were previously fed with only conventional feedstuff for thirty-three days (from May 19 to June 20) in order to make uniform the respective hen's physical conditions. These hens were then fed with each test feedstuff (20 milligrams of each sample was added in 1 kilogram of feedstuff) for sixty days (from June 21 to August 19) to observe the egg production ability. The said conventional feedstuff is continuously employed as the control.

Result:

|   | Amount added to 1 kg. feedstuff, mg. | The percentage of egg production (percent) | |
|---|---|---|---|
|   |   | Pre-test period (30 days from May 19 to June 20) | Test period (60 days from June 21 to August 19) |
| Control | 0 | 86.7 | 74.1 |
| $B_1$HCl | 20 | 85.9 | 75.0 |
| TPD | 20 | 84.1 | 80.4 |

Conclusion: TPD supplemented to conventional feedstuff contributes to preventing the decrease of egg production rate during summer, while $B_1$HCl does not.

TEST 4

Sample: $B_1$HCl, TPD.
Test material. White leghorn (breeder).

Number of one group: male _____ 4 heads a section
female _____ 33 heads a section Composition of feedstuff: The same composition as in Test 3.

Method of test: Test breeders were previously fed with only conventional feedstuff for one month to make uniform the respective breeder's physical conditions. The test breeders were fed with each test feedstuff (5 milligrams and 20 milligrams of each sample were added in 1 kilogram of feedstuff) for three months to observe the rate of egg production. The said conventional feedstuff is continuously employed as the control.

Result:

|   | Amount added to 1 kg. feedstuff, mg. | The percentage of egg production (percent) | | | |
|---|---|---|---|---|---|
|   |   | January | February | March | Average |
| Control | 0 | 49.9 | 62.5 | 62.7 | 58.4 |
| $B_1$HCl | 20 | 52.5 | 61.9 | 74.5 | 62.9 |
| TPD | 20 | 58.2 | 74.9 | 80.3 | 71.1 |

Conclusion: Addition of Compounds (I) to conventional feedstuff served to prevent decrease of the egg production even in cold winter.

TEST 5

Sample: TPD.
Test material: White Rock × White Cornish (breeder).

Number of one group: female ____ 150 heads a section
male _____ 15 heads a section Composition of feedstuff (commercial feedstuff):

|   | Percent |
|---|---|
| Corn, yellow | 48 |
| Milo (milo-maise) | 14 |
| Bran | 3 |
| Wheat middlings | 5 |
| Soy bean meal | 10 |
| Scrap powdered fish meal | 6 |
| Fish solubles | 3 |
| Fat mixed feed | 2 |
| Alfalfa meal | 3 |
| Calcium carbonate | 5 |
| Phosphoric acid ($Ca_3(PO_4)_2$) | 0.4 |
| NaCl | 0.35 |
| Vitamin premix [1] | 0.1 |
| Mineral premix [2] | 0.05 |
| Furazolidone | 0.01 |

[1] Vitamin premix (per kilogram of feedstuff):

| Vitamin A | IU | 7536 |
|---|---|---|
| Vitamin $B_1$ | mg | 2.14 |
| Vitamin $B_2$ | mg | 4.60 |
| Vitamin E | mg | 5.00 |
| Vitamin $D_3$ | IU | 1000 |
| Vitamin $B_6$ | mg | 5.00 |
| Pantothenic acid Ca | mg | 27.500 |
| Nicotinic acid | mg | 5.00 |
| Choline chloride | mg | 1400.00 |
| Folic acid | mg | 0.60 |

[2] Mineral premix (per kilogram of feedstuff):

|   | Percent |
|---|---|
| Mn | 12 |
| Zn | 4 |
| Fe | 4 |
| Cu | 0.4 |
| Co | 0.06 |

Method of test: Test breeders were previously fed with only conventional feedstuff containing 2.2 milligrams of $B_1$HCl (per kilogram) for 13 days to render uniform the respective birds' physical conditions. The breeders were fed with a feedstuff containing 20 milligrams of TPD (per kilogram of feedstuff) for 19 days to observe the percentage of egg production. The said conventional feedstuff is continuously employed as the control.

Result:

|   |   | Conventional feeding | | | TPD 20 mg. | | |
|---|---|---|---|---|---|---|---|
|   | The date* | The number of hatching eggs | The fertility, percent | The hatchability, percent | The number of hatching eggs | The fertility, percent | The hatchability, percent |
| Pre-test period | 7/13 | 672 | 93 | 87.3 | 679 | 93.7 | 84.1 |
|   | 7/19 | 416 | 90.3 | 85.6 | 355 | 91.8 | 85.6 |
|   | 7/25 | 469 | 89.8 | 88.5 | 434 | 93.6 | 85.7 |
| Average |   |   | 91.0 | 86.3 |   | 93.0 | 85.1 |
| Test period | 8/18 | 216 | 79.0 | 72.2 | 177 | 90.4 | 85.3 |
|   | 8/24 | 238 | 82.8 | 76.1 | 222 | 86.5 | 82.4 |
|   | 8/30 | 245 | 77.5 | 70.2 | 126 | 92.9 | 81.0 |
|   | 9/5 | 252 | 83.5 | 74.2 | 266 | 91.0 | 82.3 |
| Average |   |   | 80.7 | 73.2 |   | 90.2 | 80.3 |

*The date is the day on which selected eggs were put in incubator.

Conclusion: Addition of TPD to the conventional feedstuff contributes to preventing the decrease of the fertility and hatchability in summer.

Example 1

Composition A:

| Ingredient | Unit | Amount |
|---|---|---|
| Alfalfa metal | grams | 50.00 |
| Corn, yellow | do | 1420.00 |
| Fat, animal or hydrolyzed [1] | do | 30.00 |
| Fish meal | do | 50.00 |
| Limestone or oyster shell | do | 100.00 |
| Meat and bone scrap | do | 100.00 |
| Phosphate, dicalcium, (26% Ca, 18% P) | do | 5.00 |
| Soybean meal | do | 185.00 |
| Salt | do | 5.00 |
| C.D.D.S.[2] | do | 50.00 |
| Trace mineral supplement [3] | do | 0.50 |
| Vitamin premix [4] | do | 5.00 |
| TPD | milligrams | 60 |

See footnotes following Example 5.

The foregoing ingredients are intimately and homogeneously admixed. The thus-prepared composition is especially suitable for feeding, in accordance with the previously set forth procedure, to breeders in the winter time.

Example 2

Composition B:

| Ingredient | Unit | Amount |
|---|---|---|
| Alfalfa meal | grams | 50.00 |
| Corn, yellow | do | 1320.00 |
| Fat, animal or hydrolyzed [1] | do | 20.00 |
| Fish meal | do | 50.00 |
| Limestone or oyster shell | do | 125.00 |
| Meat and bone scrap | do | 100.00 |
| Phosphate, dicalcium (26% Ca, 18% P) | do | 10.00 |
| Soybean meal | do | 260.00 |
| Salt | do | 10.00 |
| C.D.D.S.[2] | do | 50.00 |
| Trace mineral supplement [3] | do | 0.50 |
| Vitamin premix [4] | do | 5.00 |
| TTFD | milligrams | 70 |

See footnotes following Example 5.

The foregoing ingredients are intimately and homogeneously admixed. The thus-prepared composition is especially suitable for feeding, in accordance with the previously set forth procedure, to breeders in the summer time.

Example 3

Composition C:

| Ingredient | Unit | Amount |
|---|---|---|
| Alfalfa meal | grams | 25.00 |
| Corn, yellow | do | 1424.00 |
| Fat, animal or hydrolyzed [1] | do | 30.00 |
| Fish meal | do | 25.00 |
| Limestone or oyster shell | do | 125.00 |
| Meat and bone scrap | do | 100.00 |
| Phosphate, dicalcium (26% Ca, 18% P) | do | 10.00 |
| Soybean meal | do | 250.00 |
| Salt | do | 5.00 |
| Trace mineral supplement [3] | do | 0.50 |
| Vitamin premix [5] | do | 5.00 |
| TTFD | milligrams | 40.00 |

See footnotes following Example 5.

The foregoing ingredients are intimately and homogeneously admixed. The thus-prepared composition is especially suitable for feeding, in accordance with the previously set forth procedure, to layers in the winter time.

Example 4

Composition D:

| Ingredient | Unit | Amount |
|---|---|---|
| Alfalfa meal | grams | 25.00 |
| Corn, yellow | do | 1325.00 |
| Fat, animal or hydrolyzed [1] | do | 20.00 |
| Fish meal | do | 25.00 |
| Limestone or oyster shell | do | 150.00 |
| Meat and bone scrap | do | 100.00 |
| Phosphate, dicalcium (26% Ca, 18% P) | do | 15.00 |
| Soybean meal | do | 325.00 |
| Salt | do | 10.00 |
| Trace mineral supplement [3] | do | 0.50 |
| Vitamin premix [5] | do | 5.00 |
| TPD | milligrams | 50 |

See footnotes following Example 5.

The foregoing ingredients are intimately and homogeneously admixed. The thus-prepared composition is especially suitable for feeding, in accordance with the previously set forth procedure, to layers in the summer time.

Example 5

Composition E:

| Ingredient | Unit | Amount |
|---|---|---|
| Alfalfa meal | Grams | 100.00 |
| Corn, yellow | do | 1194.00 |
| Fat, animal or hydrolyzed [1] | do | 20.00 |
| Fish meal | do | 50.00 |
| Limestone or oystershell | do | 100.00 |
| Meat and bone scrap | do | 50.00 |
| Phosphate, dicalcium (26% Ca, 18% P) | Grams | 20.00 |
| Soybean meal | do | 200.00 |
| Salt | do | 10.00 |
| C.D.D.S.[2] | do | 50.00 |
| Trace mineral supplement [3] | do | 0.50 |
| Vitamin premix [5] | do | 5.00 |
| TPD | milligrams | 50 |

[1] Fat may be replaced by molasses or grain.
[2] Corn Distillers Dried Grain.
[3] Trace mineral supplement contains:

| | Percent |
|---|---|
| Mn | 24 |
| Zn | 18 |
| Fe | 8 |
| Cu | 1 |
| I | 0.5 |
| Co | 0.2 |

[4] Vitamin premix contains:

| | |
|---|---|
| Vitamin A | 1600 U.S. Pharmacopoeia Units. |
| Vitamin D$_3$ | 300 International Chick Units. |
| Vitamin E | 8 IU (International Chick Units). |
| Vitamin B$_{12}$ | 0.0012 milligram. |
| Riboflavin | 0.6 milligram. |
| Nicotinic acid | 2 milligrams. |
| d-Pantothenic acid | 0.4 milligram. |
| Choline | 60.0 milligrams. |
| Menadione | 0.132 milligram. |
| Folic acid | 0.06 milligram. |
| Ethoxyqueim* | 0.011 milligram. |

*Ethoxyqueim is an antioxidant: 1,2-dihydro-6-ethoxy-2,2,4-trimethyl-quinoline.

[5] Vitamin premix contains:

| | |
|---|---|
| Vitamin A | 1600 U.S. Pharmacopoeia Units. |
| Vitamin D$_3$ | 300 International Chick Units. |
| Vitamin E | 0.4 IU (International Chick Units). |
| Vitamin B$_{12}$ | 0.008 milligram. |
| Riboflavin | 0.4 milligram. |
| Nicotinic acid | 2 milligrams. |
| d-Pantothenic acid | 0.4 milligram. |
| Choline | 60 milligrams. |
| Menadione | 0.066 milligram. |
| Folic acid | 0.03 milligram. |
| Ethoxyqueim* | 0.011 milligram. |

*Ethoxyqueim is an antioxidant: 1,2-dihydro-6-ethoxy-2,2,4-trimethyl-quinoline.

[6] Vitamin premix contains:

| | |
|---|---|
| Vitamin A | 1600 U.S. Pharmacopoeia Units. |
| Vitamin D$_3$ | 300 International Chick Units. |
| Vitamin E | 4 IU (International Chick Units). |
| Vitamin B$_{12}$ | 0.0012 milligram. |
| Riboflavin | 1.2 milligrams. |
| Nicotinic acid | 2 milligrams. |
| d-Pantothenic acid | 2.8 milligrams. |
| Choline | 80 milligrams. |
| Menadione | 0.264 milligram. |
| Folic acid | 0.12 milligram. |
| Ethoxyqueim* | 0.0227 milligram. |

*Ethoxyqueim is an antioxidant: 1,2-dihydro-6-ethoxy-2,2,4-trimethyl-quinoline.

The foregoing ingredients are intimately and homogeneously admixed. The thus-prepared composition is especially suitable for feeding, in accordance with the previously set forth procedure, to turkey breeders.

The foregoing compositions A to E are intended solely to be illustrative and to typify compositions according to the present invention.

The precise composition of the conventional poultry feedstuff is per se not part of this invention and can be varied as desired, the invention proper being tied to the use of the Compounds I in the disclosed and claimed relationship.

Having thus disclosed this invention, what is claimed is:

1. Method for elevating the rate of egg production, fertility and hatchability of poultry, which comprises feeding the poultry a compound of the formula

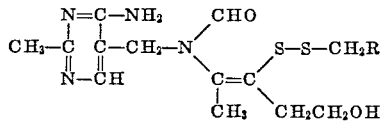

wherein R is a member selected from the group consisting of alkyl having up to 6 carbon atoms, tetrahydrofuryl and tetrahydropyranyl, in feedstuff, the amount of compound being 5 to 100 milligrams per kilogram of a feedstuff.

2. The method as claimed in claim 1, wherein the compound is thiamine propyl disulfide.

3. The method as claimed in claim 1, wherein the compound is thiamine tetrahydrofurfuryl disulfide.

4. A feed composition for elevating the rate of egg production, fertility and hatchability of laying poultry, which consists essentially of a conventional feedstuff and a compound of the formula

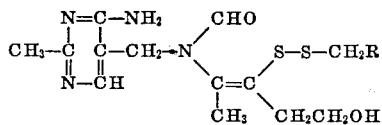

wherein R is a member selected from the group consisting of alkyl having up to 6 carbon atoms, tetrahydrofuryl and tetrahydropyranyl, in an amount of about 5 to 100 milligrams per kilogram of the feedstuff.

5. A feeding composition according to claim 4, wherein the compound is thiamine propyl disulfide.

6. A feeding composition according to claim 4, wherein the compound is thiamine tetrahydrofurfuryl disulfide.

References Cited

UNITED STATES PATENTS 2,860,050  11/1958  Huff et al. _____ 99—4
3,016,380  1/1962  Yurugi et al. _____ 260—256.5

OTHER REFERENCES

Morrison: Feeds and Feeding, The Morrison Publishing Company, 1956, pp. 135–136.

A. LOUIS MONACELL, *Primary Examiner.*

H. H. KLARE III, *Assistant Examiner.*

U.S. Cl. X.R.

99—4